United States Patent
Hung

[11] Patent Number: 6,075,563
[45] Date of Patent: Jun. 13, 2000

[54] ELECTRONIC CAMERA CAPABLE OF ADJUSTING COLOR TONE UNDER DIFFERENT LIGHT SOURCES

[75] Inventor: Po-Chieh Hung, Hino, Japan

[73] Assignee: Konica Corporation, Tokyo, Japan

[21] Appl. No.: 08/871,195

[22] Filed: Jun. 9, 1997

[30] Foreign Application Priority Data

Jun. 14, 1996 [JP] Japan .................................. 8-153924

[51] Int. Cl.[7] ...................................................... H04N 9/73
[52] U.S. Cl. ............................................ 348/223; 238/231
[58] Field of Search .................................. 348/222, 223, 348/224, 226, 227, 231, 239, 255, 256, 592, 593, 645, 647, 649, 652, 659, 661; 358/516, 518, 520; 382/162, 167; 345/150, 153, 186; H04N 9/73

[56] References Cited

U.S. PATENT DOCUMENTS

| | | | |
|---|---|---|---|
| 5,504,525 | 4/1996 | Suzuki | 348/223 |
| 5,900,860 | 5/1999 | Ueda | 345/150 |
| 5,920,645 | 7/1999 | Aida | 382/167 |

FOREIGN PATENT DOCUMENTS

| | | |
|---|---|---|
| 58-161371 | 10/1983 | Japan . |
| 59-183590 | 10/1984 | Japan . |
| 63-236931 | 10/1988 | Japan . |
| 63-267091 | 11/1988 | Japan . |
| 1-305789 | 12/1989 | Japan . |
| 2-140540 | 11/1990 | Japan . |

*Primary Examiner*—Tuan Ho
*Attorney, Agent, or Firm*—Frishauf, Holtz, Goodman, Langer & Chick, P.C.

[57] ABSTRACT

An electronic camera comprises a first chromaticity data memory to memorize chromaticity data of at least three different color chips, each color chip having a vector independent of others in color space; a CPU to determine a converting matirx to convert chromaticity data of photographed image data corresponding to the three different color chips so as to conform with the memorized chromaticity data of the three different color chips; and a converter to convert the image data by the determined converting matrix.

21 Claims, 3 Drawing Sheets

FRONT SURFACE OF IMAGE SENSOR

FIG. 7

ELECTRONIC CAMERA CAPABLE OF ADJUSTING COLOR TONE UNDER DIFFERENT LIGHT SOURCES

BACKGROUND OF THE INVENTION

The present invention relates to an electronic camera, and in particular to a technique to adjust a color tone under different light sources.

In a conventional camera, techniques relating to the present invention are listed below and explained.

(1) Japanese Patent Application Open to Public Inspection Publication No. 59-183590 discloses a technique to memorize white balance information for each sheet of photographed image frames and to convert a color tone based on the memorized white balance information at the time of reproducing images.

(2) Japanese Utility Model Application Open to Public Inspection Publication No. 58-161371 discloses a technique to mount a standard white plate on a back side of a lens cap and to adjust white balance by using the standard white plate.

(3) Japanese Utility Model Application Open to Public Inspection Publication No. 2-140540 discloses a technique to make color filters for adjusting white balance in a structure capable of using three colors simultaneously so that white balance adjustment can be completed for a short time period.

(4) Japanese Patent Application Open to Public Inspection Publication No. 1-305789 discloses a technique to introduce light from the outside of an electronic camera casing to color sensors through an optical fiber and to adjust white balance by using light from the optical fiber.

(5) Japanese Patent Application Open to Public Inspection Publication No. 63-267091 discloses a technique to utilize a fact that a fluorescent light source contains flicker and to adjust white balance by identifying a kind of a light source based on flicker when the flicker is detected from the light source.

(6) Japanese Patent Application Open to Public Inspection Publication No. 63-236931 discloses a technique to discriminate kind of a light source based on chromaticity coordinates in the case that a light source is a fluorescent light.

However, in the above conventional techniques, since the electronic camera is subject to color tone adjustment for photography under a light source of day light, a skin color may be photographed relatively dark under a regular type fluorescent light as an example even when white balance was adjusted, resulting in that sufficient color tone may not be obtained. Further, a problem that a red color component becomes too strong under a tungsten light source light may happen.

Further, white balance is not adjusted in accordance with human adaptability. In such a white balance adjustment, ratios among R, G and B signal values outputted from CCD are merely changed or color difference values between R and Y and between B and Y are changed. However, even if white balance is adjusted by those techniques, a color other than white, in particular, a visual impression for a memorized color of a skin color may change to cause malfunctions.

Still further, when color filters are deteriorated, spectral distribution characteristics of the color filters may deviate from normal characteristics for wavelength so that color adjustment cannot be conducted correctly. Correction for the deterioration of the color filters is conducted only once when an electronic camera is assembled, and after the camera is delivered as a product, correction cannot be conducted. Accordingly, color balance becomes out of order due to deterioration as time elapses, with the result being in that good color tone cannot be obtained.

Furthermore, although adaptability of the human eye is well known according to the Von Kries model, there has not yet been a technique to utilize it for a image photographing system.

SUMMARY OF THE INVENTION

In view of the above problems, an objective of the present invention is to provide an electronic camera having a high-precise color balance adjusting method with which the same color tone as that obtained by photography under a light source of day light can be obtained even when photography is conducted under various light sources, and whose visual impression does not change greatly by correcting a change in color tone characteristic caused by deterioration of color filters.

Structure 1. In order to attain the above objective, in an electronic camera in which optical information is converted into electronic signals by image photographing elements and the electronic signals converted by the image photographing elements are processed so that image signals are outputted, the electronic camera of the present invention is constructed so as to comprise a standard light source setting means for imaginatively setting a standard light source as a kind of a light source for an image to be outputted, and a color tone converting means for converting color tone of a photographed image under an actual light source at the time of photography to color tone under the standard light source set by the standard light source setting means by adjusting color balance for at least three colors.

Structure 2. In Structure 1, the color tone converting means converts based on color tone under the actual light source at the time of photography and color toner under the standard light source for a color chip whose chromaticity coordinates are known in advance.

Structure 3. In Structure 2, the color chip contains a skin color.

Structure 4. In Structures 2 or 3, the color chip is a transmission type color chip which generates a color when transmitting light itself.

Structure 5. In Structure 4, the transmission type color chip is located right before the photographing elements only during the color tone adjustment in which the photographing elements are irradiated with light transmitted through the transmission type color chip, and during the usual photography, the transmission type color chip is shifted away from the light passage to the photographing elements.

Structure 6. In Structure 4, the transmission type color chip is fixed right before the photographing elements so that a specific section of the photographing elements is irradiated with light transmitted through the transmission type color chip.

Structure 7. In Structure 6, the specific section is positioned at an upper portion of the photographing elements, and the camera further comprises a light introducing section to introduce light from an upper portion of the camera main body to the inside of the camera so that the specific section is irradiated with the light from the light introducing section.

Structure 8. In Structure 2, the color chip is a reflection type color chip which indicates color with light reflected on itself.

Structure 9. In structure 1, the color tone converting means convert by using a converting matrix of three rows and three columns.

Structure 10. In Structures 1 to 8, the color tone converting means outputs the photographed image and chromaticity information of the color chip through an interface to the outside of the electronic camera and conducts the converting process at the outside of the electronic camera.

Structure 11. In Structures 1 to 10, the converting means converts color tone at the time of photography under a light source of monochromatic light to an extent that the color tone becomes close to color tone under a setting light source and is not converted perfectly to the color tone under the setting light source.

Structure 12. In Structure 1, there are provided a chromaticity information recording section to record chromaticity information for plural standard light sources and a photographing light source selecting means for selecting a kind of a light source at the time of photography from the standard light sources recorded in the chromaticity information recording section; and the color tone converting means converts color tone of the photographed image from color tone under a light source at the time of photography to color tone under a light source of day light.

Structure 13. In Structure 12, the photographing light source selecting means comprises a manually selecting mode in which the kind of the light source at the time of photography is selected by an instruction of an operator and an automatically selecting mode in which the kind of the light source at the time of photography is selected on the basis of chromaticity coordinates obtained by photographing a white object; and the operator can select the kind of the light source by selecting either one of the manually selecting mode and the automatically selecting mode.

Structure 14. In Structure 13, the operator can select the kind of the light source by a switching operation.

Structure 15. In Structure 13, the automatically selecting mode selects a standard light source having a chromaticity closest to the chromaticity of the light source at the time of photography from the standard light sources recorded in the chromaticity information recording section and sets the selected standard light source as the light source at the time of photography.

Structure 16. In Structure 13 or 15, the automatically selecting mode detects a presence or absence of flicker for the light source at the time of photography, and when the flicker is detected, the kind of the light source is selected from fluorescent light sources.

Structure 17. In Structures 1 to 16, the color tone converting means comprises a direct output means to output the color tone seen by eyes at the time of photography; and the case of outputting by the direct output means or the case of outputting color toner under a light source of day light can be selected.

Structure 18. In Structures 13 to 15, there is provided a color tone finely adjusting means for finely adjusting color tone of the photographed image to conform with color tone under a standard light source having a chromaticity closest to the chromaticity of the light source at the time of photography by gain control; and the color tone converting means converts the color tone adjusted by the color tone finely adjusting means into color tone under a light source of day light.

Structure 19. In Structures 1 to 18, there is provided an adapting means for converting the color tone of the image into color tone corresponding to adapting characteristics of the human eye; the conversion by the adapting means and the conversion by the color tone converting means are combined and then outputted.

Structure 20. In Structures 1 to 19, there are provided an indicating means to indicate a conversion process result of the photographed image and a gradation converting means for converting the gradation in accordance with the gradation characteristics of the indicating means.

Structure 21. In Structure 20, at least two of the converting processes by the color tone converting means, the adapting means and the gradation converting means are integrated in a single matrix, and the converting processes is conducted at a time by using the single matrix during usual photography.

According to Structure 1, by converting color tone under a light source at the time of photography into color tone under a standard light source by adjusting color balance of at least three colors, an image photographed under a light source other than the standard light source can be converted precisely into color tone under the standard light source. Accordingly, normalized color tone can be expressed without depending the kind of the light source at the time of photography.

According to Structure 2, by converting into color tone under the standard light source by using a color chip whose chromaticity coordinates are known, color tone can be converted with more enhanced precision.

According to Structure 3, by using a color chip of skin color which is an important color for image quality evaluation and has spectral reflection ratio characteristics characterized in that sensitivity changes in proportion to wavelength, chromaticity for skin color can be matched more correctly and also chromaticity for other colors can matched with high precision.

According to Structure 4, by using the transmission type color chip, the color chip can be located just before the photographing elements in the electronic camera, whereby color deterioration of the color chip can be avoided as far as possible, change in outputted color tone characteristics of the electronic camera can be reduced, and troublesomeness to store the color chip separately from the electronic camera main body can be eliminated.

According to Structure 5, since the transmission type color chip can be located just before the photographing elements only during color tone adjustment, the color tone can be adjusted without limiting the photographing view field during usual photography.

According to Structure 6, by irradiating the specific portion of the photographing elements with light transmitted through the transmission type color chip, moving parts can be eliminated, whereby troubles in the electronic camera main body can be avoided as far as possible.

According to Structure 7, by introducing light from the upper portion of the electronic camera main body, color of the transmission type color chip can be irradiated onto the upper section of the photographing elements, whereby color tone can be adjusted simply without photographing a white object during color tone adjustment.

According to Structure 8, by using the reflection type color chip, the color chip can be formed colorful, for example, the color chip of skin color can be formed in a color closer to actual skin color, whereby color reproducibility can be enhanced.

According to Structure 9, by using the converting matrix of three rows and three columns, a calculation to convert color tone can be simplified so that the calculation can be conducted at more high speed.

According to Structure 10, by outputting information necessary for the converting process to the outside of the electronic camera, since the converting process can be conducted by utilizing a calculating apparatus such as a personal computer, a more complicate process can be conducted at high speed and the processing load to conduce the processing in the electronic camera main body can be reduced. As a result, parts of the electronic camera can be simplified and the electronic camera main body can be made smaller and lighter.

According to Structure 11, since an image photographed under a monochromatic light source is not completely converted into color tone under the standard light source, an event that color tone conversion becomes impossible can be avoided beforehand.

According to Structure 12, since a light source at the time of photography is selected from a plurality of standard light sources previously prepared and the color tone under the selected standard light source is converted into color tone under a light source of day light, it is not necessary to prepare in advance a color chip whose chromaticity is known and color tone can be converted simply, whereby an operability for the electronic camera can be enhanced.

According to Structure 13, by making it possible to select freely the manually setting mode or the automatically setting mode, a demand of an electronic camera operator can be realized more faithfully. By selecting a more suitable mode, the kind of the light source can be set more correctly.

According to Structure 14, By changing the kind of the light source with switches, the light source can be set simply and surely.

According to Structure 15, by setting the kind of light source automatically, in the case that a light source at the time of photography is not easily identified, the light source can be set simply.

According to Structure 16, in the case that flicker is detected from a light source at the time of photography, by setting the light source from fluorescent light sources, the kind of the light source can be identified more correctly.

According to Structure 17, by making it possible to select color tone seen by eyes or color tone under a standard light source, an image with suitable color tone can be outputted in accordance with a demand of an electronic camera operator.

According to Structure 18, by conducting fine adjustment for color tone by gain control after the color converting means converts color tone, color tone under a light source other than the standard light sources previously prepared can be outputted in conformance with color tone under the light source of day light.

According to Structure 19, by converting into color tone in accordance with adapting characteristics of the human eye by the adapting means, the color tone felt by an operator at the time of photography can be outputted, whereby the image conformed with the human subjectivity can be obtained.

According to Structure 20, by indicating the color tone conversion result with the consideration for gradation characteristics, the image after conversion can be indicated more correctly.

According to Structure 21, by integrating the color tone converting process, the adapting process and the gradation characteristic converting process into a single converting matrix, the converting process during the usual photography can be made simplified at more high speed.

DETAILED DESCRIPTION OF THE PREFERRED EMBODIMENT

Hereinafter, the preferred embodiment of the present invention is explained on the basis of FIGS. 1 through 7.

Firstly, the first embodiment in which color tone of an image is changed by changing coefficients of a color tone conversion matrix for each light source by using color chips is explained.

Figure 1:
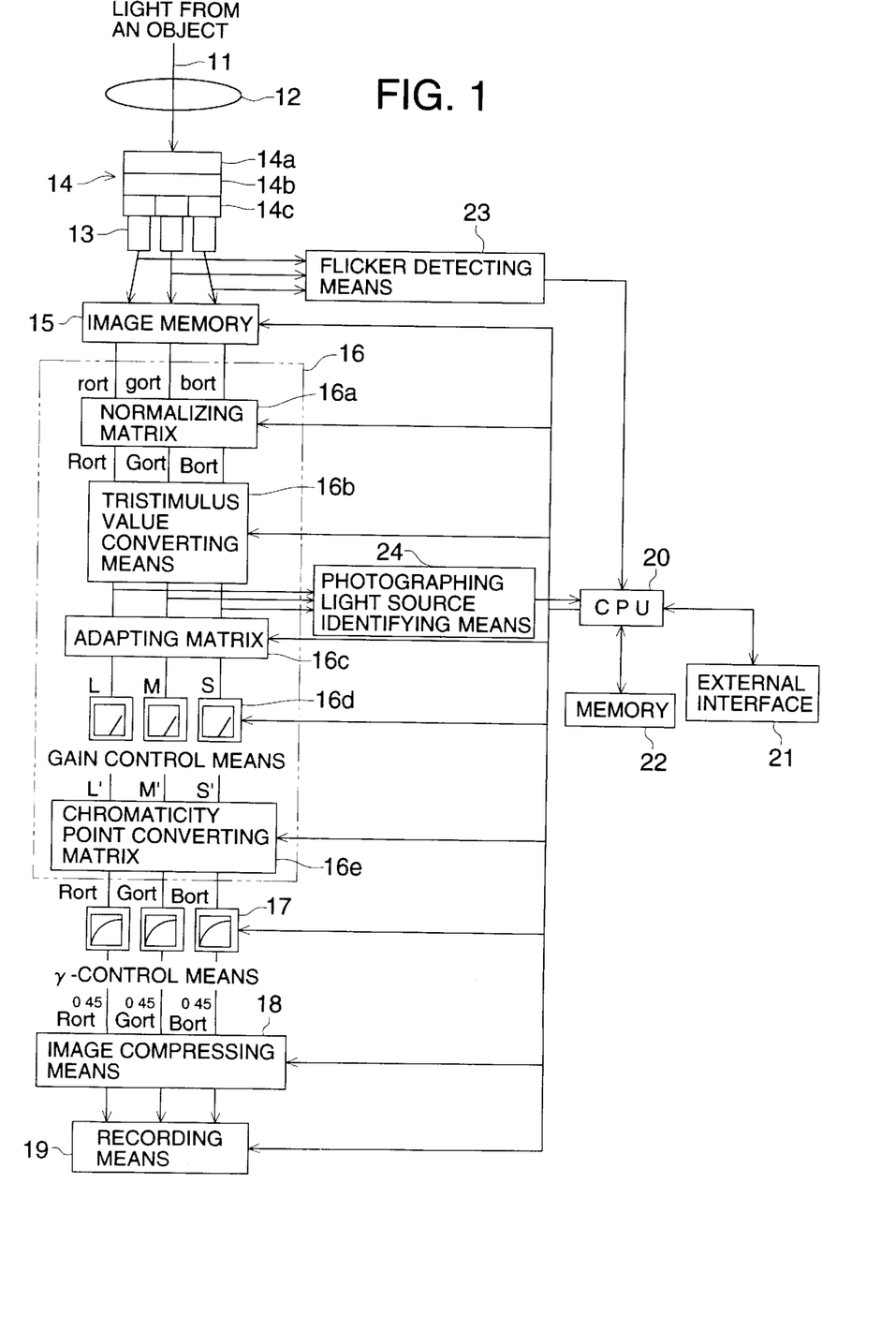
FIG. 1 is a schematic diagram showing an outlined structure of signal conversion courses of an electronic camera.

FIG. 1 shows a outline of a construction of signal conversion paths of an electronic camera in the present embodiment. In the electronic camera shown in FIG. 1, light 11 from an object to be photographed passes a lens 12 and is irradiated onto CCD 13 (Charge Coupled Device) used as an image photographing device through various types of filters which are superimposed and located on the CCD 13. With this, the light 11 from the object is converted into electronic signals. In this description, assuming the case in which an RGB three plate type is employed, the embodiment is explained. However, a single plate type of RGB (red-green-blue) mosaic filter or CMY (cyan-magenta-yellow) mosaic filet may be used. In the case of the single plate type, it is necessary to use a function to interpolate signals deteriorated by the mosaic filter.

Figure 2:
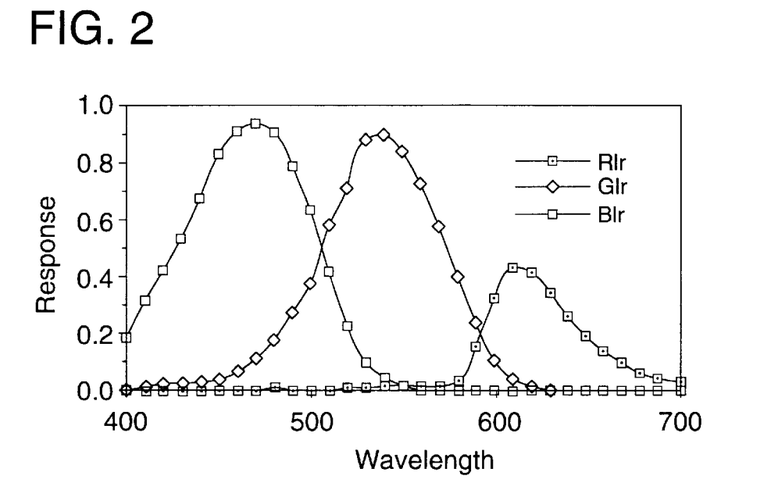
FIG. 2 is a graph showing spectral sensitivity characteristics of RGB filters.

As the above filter 14, for example, a spatial low frequency filter 14a allowing a low frequency component to pass through, an infrared ray cut filter for cutting infrared rays 14b and RGB or CMY color filters 14c are used. In many cases, the spatial low frequency filter 14a is constructed by a crystal glass. An example of spectral sensitivity characteristic for each of RGB color filters is shown in FIG. 2.

After the electronic signals outputted from CCD 13 are subjected to A/D conversion, the electronic signals are memorized in an image memory 15. The image data to be recorded are converted by normalizing matrix 16a in an image processing section 16 so as to become close to color tone obtained by photographing under a standard light source. Then, the converted image data are converted into tristimulus values by a tristimulus value converting means 16b and are further converted by an adapting matrix 16c so as to become closer to the sensitivity of the human retina. In this embodiment, the processing order of the normalizing matrix 16a and the adapting matrix 16c may be changed reversibly. Further, the image data may be converted into evaluation parameters other than the tristimulus values.

Next, by gain control means 16d, three values of RGB (or LMS mentioned later) are multiplied with coefficients respectively so that images obtained by photographing a standard white chip show a proper white point, whereby color tone is adjusted and proper white balance is set.

After the process by the gain control means 16d, the chromaticity point of the image data is converted by a chromaticity point converting matrix 16e so as to be displayed properly on CRT. The gradation characteristic of the image data is adjusted by γ-control means 17 so as to conform with the gradation characteristic of CRT. Further, after the process of γ-control means 17, the image data are subject to image data compressing process such as JPEG (Joint Photographic Coding Experts Group) in accordance with its necessity. In a recording means 19, the image data after the image data compressing process are recorded in a recording medium such as a memory card or a optical magnetic disk. Incidentally, these successive processes are controlled by CPU 20.

Next, detail of each signal converting step of the above electronic camera is sequentially explained.

Figure 3:
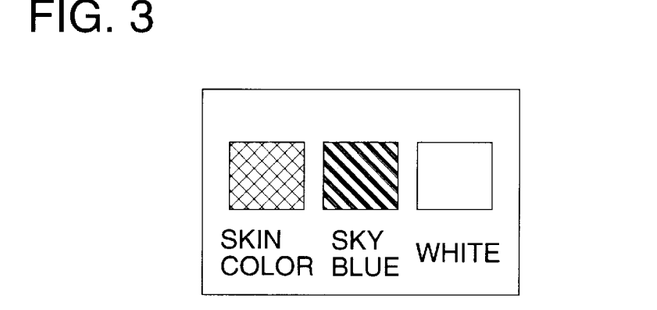
FIG. 3 is a view showing color chips of three colors.
Figure 4:
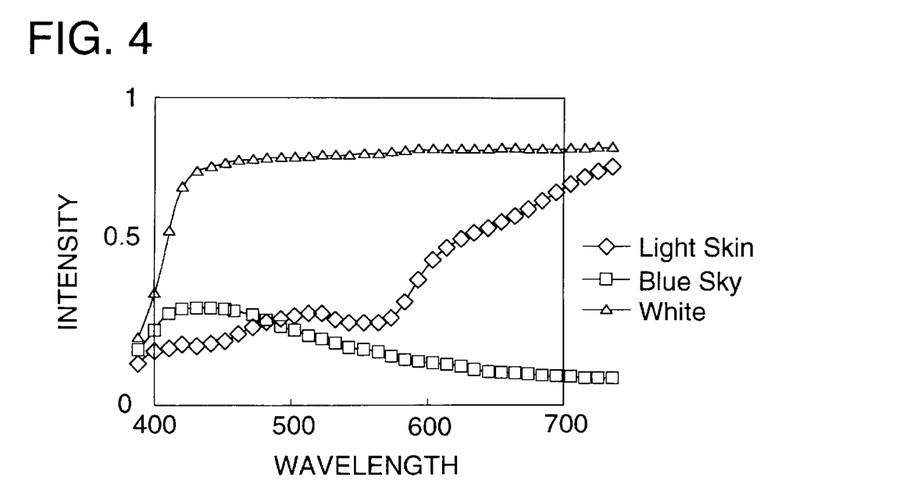
FIG. 4 is a graph showing spectral distribution characteristics of the color chips.

Firstly, a method of determining the normalizing matrix 16 is explained. Normalization for a photographed image can be conducted by the following steps. A color chip whose chromaticity is know is photographed in advance, and then image data obtained from the photographed color chip are adjusted so as to conform with the known chromaticity. As the color chip photographed in advance, for example as shown in FIG. 3, skin color, sky blue and white are considered as being appropriate. The reason for it is because, in many cases, color may be judged with a memory color such as the skin color or the sky blue. Further, the reason why the white is included is to match white balance correctly for achromatic color. Furthermore, the reason why the three colors are set as the color chips is to reduce the calculation load as small as possible. BY using the three different color chips, chromaticity data of the three different color chips each of which has a vector independent of others in color space can be obtained.

By matching the chromaticity of the above three colors, color can be reproduced more correctly. Incidentally, as the color chips shown in FIG. 3, since Light Skin, Blue Sky, White in Macbeth Color Checker which is well know in general, are used, spectral and color information are evident in detail.

Accordingly, in order to obtain a normalizing matrix, firstly, the color chips are photographed by the electronic camera under a light source under which an object is photographed, the image data obtained by photographing the color chips are memorized in an image memory 15 in the electronic camera. On the other hand, the image data obtained under the standard light source are also memorized in an inside memory.

Now, assuming that colors of the color chips are white, skin color and blue sky and output values from CCD 13 are Xw, Xs, Xb (X is either r, g or b) when CCD 13 reads them. Further, assuming that output values obtained under the standard light source are Yw, Ys, Yb (Y is either R, G or B). Accordingly, if the normalizing matrix to convert the output values obtained under the actual light source to the output values under the standard light source is represented by aij, formula (1) is established.

$$\begin{bmatrix} R_w & R_s & R_b \\ G_w & G_S & G_b \\ B_w & B_s & B_b \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} r_w & r_s & r_b \\ g_w & g_s & g_b \\ b_w & b_s & b_b \end{bmatrix} \quad (1)$$

If the formula (1) is solved in terms of the normalizing matrix aij, formula (2) is obtained.

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} R_w & R_s & R_b \\ G_w & G_S & G_b \\ B_w & B_s & B_b \end{bmatrix} \begin{bmatrix} r_w & r_s & r_b \\ g_w & g_s & g_b \\ b_w & b_s & b_b \end{bmatrix} \quad (2)$$

From the formula (2), the normalizing matrix aij in the form of (3×3) can be obtained. By using the normalizing matrix, the photographed image data can be converted into the image data under the standard light source. As a result, even if an image is photographed under a different light source, color reproduction equivalent to that obtained by photographing under the standard light source can be obtained. Further, by constructing the normalizing matrix in the form of (3×3), the calculation can be made simple as far as possible while conversion errors are refrained to an extent not to cause a problem.

When an object is photographed under a monochromatic light such as a sodium lamp, it may be difficult to convert it perfectly into color tone under the standard light source. Because an inverse matrix of the formula (2) can not be calculated and it may be impossible to calculate aij. Then, when the perfect correction is not made applicable by changing the right side of the formula (2), it may be possible to convert it into color tone under the standard light source, though the conversion is an approximate manner.

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} R_w & R_s & R_b \\ G_w & G_S & G_b \\ B_w & B_s & B_b \end{bmatrix} \cdot \quad (3)$$

$$\left( (1-\alpha) \begin{bmatrix} R_w & R_s & R_b \\ G_w & G_S & G_b \\ B_w & B_s & B_b \end{bmatrix} + \alpha \begin{bmatrix} r_w & r_s & r_b \\ g_w & g_s & g_b \\ b_w & b_s & b_b \end{bmatrix} \right)^{-1}$$

For example, if the normalizing matrix aij is made as represented by formula (3), when α is 1, the color tone is reproduced as color toner under the standard light source. On the other hand, when α is 0, the color tone is reproduced as color tone under the light source at the time of photography. Further, when α is 1 and an inverse matrix can not be calculated as at the time of photography under monochromatic light, α is reduced to an extent such as 0.9 for example that the inverse matrix can be obtained.

With this technique, even under a special light source, the normalizing matrix to reproduce properly color tone under the standard light source can be obtained as far as possible so that an event that color tone could not be converted may be avoided previously.

As stated above, by providing an electronic camera with a converting function to convert into color tone under the standard light source, the key feature of the present embodiment is that not only white balance is adjusted in color tone conversion, but also color balance for each of three colors by using the color chips of the three colors is adjusted.

Figure 5:
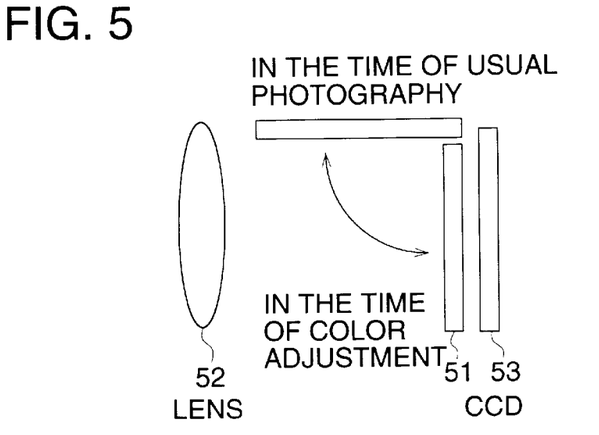
FIG. 5 is a sectional view showing a structure of a transmission type filter which is located in front of CCD at the time of color tone adjustment.

As the color chips, for example, a transmission type filter 51 shown in FIG. 5 may be used. That is, the transmission type filter 51 shown FIG. 5 is formed by, for example, a transmitting glass. Only at the time of color tone adjustment, the transmission type filter 51 is arranged to located in the path between the lens 52 and the CCD 53 so as to cover the entire surface of the CCD 53. At the time of photography as usual, the transmission type filter 51 is rotated by 90 degrees in angle as one example so as to be removed from the light path. With this arrangement, the normalizing matrix can be set by simply conducting color tone adjustment. At the time of a usual photographing operation, a photographing view field is not limited by the transmission type filter 51. Further, the troublesomeness caused by storing the color chips separately from the main body of the electronic camera can be eliminated. Incidentally, it may be not necessary to photograph all of the color chips of the three colors at the time of color tone adjustment. For example, it may be possible only by photographing a white object.

Figure 6:
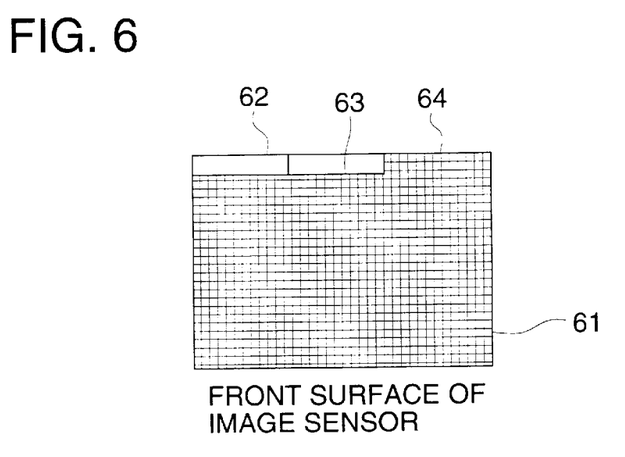
FIG. 6 is a front view of the transmission type filter fixed on an upper edge of CCD.

In addition to the above, it may be possible to arrange in such a construction that filters are arranged stationary on the upper edge of CCD 61 as shown in FIG. 6. That is, by arranging a skin color filter 62 and a blue sky filter 63 from the left side on the top edge, although a part of an image frame is covered by them, since it is not necessary to use a moving mechanism, the construction of the electronic camera can be simplified. With regard to a white filter, a white or transparent filter may be arranged on the right side on the upper edge of the CCD 61, it may be possible not to provide a filter in order to simplify the filter arrangement.

Figure 7:
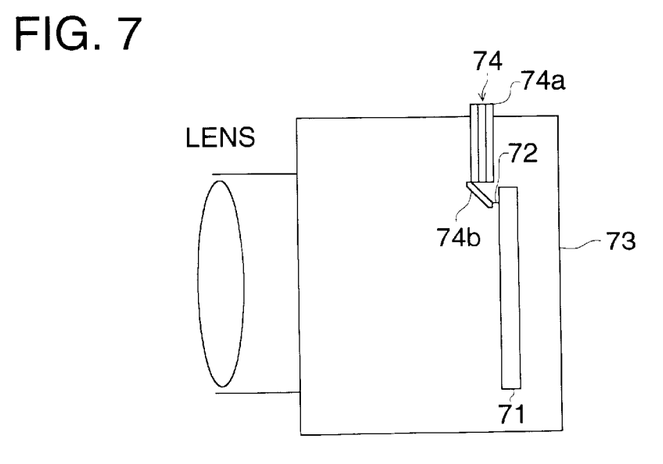
FIG. 7 is a sectional view showing a structure of an electronic camera equipped with a light introducing section arranged on an upper section of the camera.

Furthermore, light is introduced from the outside through a light introducing section 74 provided on the upper section of the electronic camera 73 and are irradiated onto the filters fixed on the upper edge of the CCD 71, color tone can be adjusted without photographing a white object. It may be preferable to provide the light introducing section 74 on the upper section of the electronic camera. As the light introducing section 74, optical fiber 74*a* or mirror 74*b* may be used. Specifically, by using the optical fiber, degree of freedom in the design for the electronic camera may be increased.

Incidentally, in the case of using the light transmission type filter shown in FIG. 6, since types of usable spectral distribution characteristics are limited, it may be difficult to set spectral distribution characteristics freely. Then, in the case of using a reflection type color chip as the color chip for photography, since kinds of available coating material are increased in comparison with the transmission type, a color chip having a color feeling more closer the skin color as one example can be easily produced. Accordingly, a range of color reproduction can be expanded and the precision in the color reproduction can be enhanced. Further, in the case of forming the reflection type color chip on the back surface of a cover of a camera lens, chromaticity can be easily adjusted.

Still further, without processing the image data inputted from CCD in the electronic camera, the following structure may be used. The image data are outputted together with photographing data of a color chip necessary for the calculation to the outside of the electronic camera through external interfaces 21 (for example, USB, IrDA, SCSI, RS-422 and etc.) provided on the camera and are processed by using an external calculating apparatus such as a personal computer. With above structure, the situation that the processing for a heavy calculation load such as image compression are conducted in the camera can be avoided, and a more complicate calculation can be conducted rapidly. Further, by processing the image data at the outside of the electronic camera, the constructions of parts of the electronic camera can be made simple, whereby the main body of the electronic camera can be made smaller and lighter at low cost. Now, returning to the signal conversion paths of the electronic camera shown in FIG. 1, and the image processing will be explained.

The image data (Rccd, Gccd, Bccd) processed by the normalizing matrix 16*a* obtained by the abovementioned method are feed to a tristimulus value converting means 16*b*. The tristimulus value converting means 16*b* has a matrix indicated in formula (4) to convert the image data (Rccd, Gccd, Bccd) into tristimulus values (X, Y, Z) so as to observe an image with normal color under the illumination by a D65 light source.

$$\begin{bmatrix} X \\ Y \\ Z \end{bmatrix} = \begin{bmatrix} 0.668422 & 0.126056 & 0.150852 \\ 0.323196 & 0.690457 & -0.017638 \\ 0.022255 & -0.072755 & 1.132761 \end{bmatrix} \begin{bmatrix} R_{ccd} \\ G_{ccd} \\ B_{ccd} \end{bmatrix}$$

Adaptation stimulus values (L, M, S) which are spectral sensitivities in accordance with the human retinal sensitivity are obtained for the conversion result that the photographed image data are converted into the tristimulus values (X, Y, Z). Generally, several converting matrixes to conform the tristimulus values with the human retinal sensitivity are known. In this embodiment, a matrix indicated in a formula (5) is used as an example. Incidentally, a formula (6) is a result that the formula (4) is substituted in the formula (5).

$$\begin{bmatrix} L \\ M \\ S \end{bmatrix} = \begin{bmatrix} 0.15514 & 0.54312 & -0.03286 \\ -0.15514 & 0.15684 & 0.03286 \\ 0 & 0 & 1 \end{bmatrix} \cdot \begin{bmatrix} X \\ Y \\ Z \end{bmatrix} \quad (5)$$

$$\begin{bmatrix} L \\ M \\ S \end{bmatrix} = \begin{bmatrix} 0.278502 & 0.396948 & -0.023399 \\ 0.044681 & 0.293481 & -0.005762 \\ 0.022255 & -0.072755 & 1.132761 \end{bmatrix} \begin{bmatrix} R_{ccd} \\ G_{ccd} \\ B_{ccd} \end{bmatrix} \quad (6)$$

By obtaining such adaptation stimulus values, since color tone can be reproduced in conformance with the color tone sensed by a human at the time of photography, an image in conformance with the subjectivity of the human can be obtained. Incidentally, it may be permissible that the result converted into the tristimulus values are merely outputted without obtaining the adaptation stimulus values.

Gain control to adjust white balance is conducted for the obtained adaptation stimulus values in accordance with the necessity, then another adaptation stimulus values (L', M', S') indicated in a formula (7) are obtained.

$$\begin{bmatrix} L' \\ M' \\ S' \end{bmatrix} = \begin{bmatrix} \alpha L \\ \beta M \\ \gamma S \end{bmatrix} \quad (7)$$

Herein, $\alpha$, $\beta$, and $\gamma$ are coefficients for gain control.

Next, a chromaticity point conversion matrix is used for the adaptation stimulus values (L', M', S') which is obtained from the formula (7) after the gain control, whereby the adaptation stimulus values (L', M', S') are conformed with color tone display characteristics of CRT on which the photographed image is displayed. In more concrete, a formula (8) which is obtained from the reverse matrix of the formula (5) is substituted in a formula (9) indicating a relationship between adaptation stimulus values (Rcrt, Gcrt, Bcrt) obtained from the characteristics of a fluorescent substance of CRT and the tristimulus values (X, Y, Z). As a result, a chromaticity point converting matrix indicated in a formula (10) can be obtained. Incidentally, the formula (9) is set on the basis of the standard for HDTV (High Definition Television)

$$\begin{bmatrix} X \\ Y \\ Z \end{bmatrix} = \begin{bmatrix} 2.9448 & -3.5010 & 0.2118 \\ 1.0 & 1.0 & 0.0 \\ 0.0 & 0.0 & 1.0 \end{bmatrix} \cdot \begin{bmatrix} L' \\ M' \\ S' \end{bmatrix} \quad (8)$$

$$\begin{bmatrix} R_{crt} \\ G_{crt} \\ B_{crt} \end{bmatrix} = \begin{bmatrix} 3.241 & -1.537 & -0.499 \\ -0.969 & 1.876 & 0.042 \\ 0.056 & -0.204 & 1.057 \end{bmatrix} \cdot \begin{bmatrix} X \\ Y \\ Z \end{bmatrix} \quad (9)$$

$$\begin{bmatrix} R_{crt} \\ G_{crt} \\ B_{crt} \end{bmatrix} = \begin{bmatrix} 8.007097 & -12.883741 & 1.185444 \\ -0.977511 & 5.268469 & -0.163234 \\ -0.039091 & -0.400056 & 1.068861 \end{bmatrix} \cdot \begin{bmatrix} L' \\ M' \\ S' \end{bmatrix} \quad (10)$$

Then, output image data (Rcrt, Gcrt, Bcrt) are obtained by calculating sequentially the normalizing matrix, the adapting matrix to convert the tristimulus values, and the chromaticity point converting matrix mentioned above. Incidentally, it may be preferable that the above matrixes are integrated in advance into a single matrix and the above calculation is conducted by the single matrix. With this, a high speed calculation can be attained.

Now, assuming that the adapting matrix is the formula (6), the chromaticity matrix is (9), and all of the coefficients α, β, and γ for gain control are 1, coefficients of the integrated single matrix are indicated in a formula (11).

$$\begin{bmatrix} R_{crt} \\ G_{crt} \\ B_{crt} \end{bmatrix} = \begin{bmatrix} 1.658498 & -0.616380 & -0.049227 \\ -0.040451 & 1.170093 & -0.131689 \\ -0.004977 & -0.210696 & 1.209374 \end{bmatrix} \cdot \begin{bmatrix} R_{ccd} \\ G_{ccd} \\ B_{ccd} \end{bmatrix} \quad (11)$$

Accordingly, by employing the integrated single matrix indicated in the formula (11) as parameters in the image processing section 16 shown in FIG. 1, image data photographed under various kinds of light sources are converted into color tone under the light source of day light and output image data of the adaptation stimulus values in accordance with the human retinal sensitivity can be outputted by a simple calculation with a consideration for the color tone display characteristic of CRT. In the formula (11), the calculation was conducted with the assumption that the coefficients for gain control are 1, however, by setting matrix by changing the coefficients appropriately, output image data can be obtained in the same way for other various conditions.

Further, display image data ($Rcrt^{0.45}$, $Gcrt^{0.45}$, $Bcrt^{0.45}$) conformed with the gradation characteristic of CRT are obtained by subjecting the output image data (Rcrt, Gcrt, Bcrt) to γ-control in accordance with the γ-characteristic of CRT. With the display image data, the photographed image can be displayed on the CRT correctly.

Furthermore, by recording the thus obtained image data after image compression process, the recording capacity can be saved, the image can be stored efficiently, and the recorded image can be reproduced simply.

As explained above, in this embodiment, an image photographed under a light source other than the standard light source of day light can be converted so as to have color tone photographed under the light source of day light. Accordingly, the normalized color tone expression can be conducted without depending on the kind of light source in the case of photographing. In addition, since the conversion is conducted in accordance with the human retinal sensitivity, an image in conformance with the subjectivity of the human can be obtained.

Further, the color tone converting process in the present embodiment can be applied in the case that an image is irradiated simultaneously with plural different light sources. For example, in the case of light emission by a flash light device such as a strobe, a chromaticity of the color chips are obtained in advance by emitting light and an adjustment can be conducted by adding the detected chromaticity with a chromaticity of a residing light source.

Incidentally, in the present embodiment, the photographed image data are converted into the tristimulus values and then plural processing are conducted. However, the present invention is not limited to this manner. For example, by using R, G, B signals outputted from CCD without converting, the plural processing can be conducted.

Next, the second embodiment is explained. In the second embodiment, chromaticity information of several standard light sources are memorized in advance in an electronic camera, a standard light source having chromaticity closer to that of the light source at the time of photography is selected among the memorized standard light sources, and color reproduction is conducted based on the chromaticity information of the selected standard light source.

In the electronic camera in the present embodiment, matrix coefficients of the standard light source more closer the light source at the time of photography is selected among plural standard light sources memorized in a memory 22, color tone of the photographed image is converted into color tone under the light source of day light such as D50 or D65 on the basis of the selected matrix coefficients.

As a method of discriminating a kind of the light source at the time of photography, the following methods are listed as examples.

A manual method in which an operator for the electronic camera acknowledges the kind of the light source and orders an instruction "change a switching condition of the electronic camera".

An automatic method in which a white object is photographed and the similarity of the photographing light source to the preliminarily set standard light sources is checked from the chromaticity coordinates of the photographed image data and the kind of the photographing light source is automatically discriminated.

Firstly, there may be a case that a photographer can identify the kind of the light source at the time of photography. In such a case, the standard light source can be set simply correctly. For example, as the standard light source, the matrix coefficients for light sources of A, D50, D55, D60, D70, D75, F2, F8, and F11 are preliminarily memorized in the memory 22 in the electronic camera, a proper standard light source is selected by the photographer among the memorized standard light sources by changing switches at the time of photography. With this manner, the kind of the light source can be set simply surely.

On the other hand, in the case that a photographer can not easily identify the kind of the light source at the time of photography, the light source is identified by using the automatically-discriminating method.

Incidentally, there may be a case in which it is difficult to discriminate the kind of the light source at the time of photography due to the presence of the different standard light sources such as D50 and F8 which are the light sources having the same chromaticity coordinates. Accordingly, in addition to the measurement result of the chromaticity coordinates of the light source, the discrimination is conducted on the basis of the detection result for the presence or absence of flickers. That is, since F2, F8, F11 light sources which are the standard light sources of a fluorescent light contains flickers synchronizing with frequency of the electronic power source, flicker judgment 23 is conducted for the output from CCD so as check the presence or absence of the flickers, whereby whether the light source at the time of photography is a fluorescent light source can be judged. With this judgment, in comparison with the identification from only the chromaticity point, the high accuracy identification for the kind of light source can become possible. Further, the setting of the kind of light source can be conducted automatically, the light source can be set simpler than the manual method.

Incidentally, F2, F8 and F11 are selected respectively light sources of fluorescent lamps of a regular type, a high color rendering index type and a three wavelength region light emission type. With this way, by making it possible for an operator of an electronic camera to select appropriately a manual method or an automatic method, the degree of freedom for photography is increased and the demand of the photographer can be faithfully realized.

In the case of identifying the standard light source closest to the light source at the time of photography, the distance between the chromaticity coordinates of the light source at the time of photography and the chromaticity coordinates of the standard light source memorized in advance is calculated and it may be permissible to determine the standard light source having the shortest distance as the light source at the time of photography.

In order to attain the above, the conversion result that signal values of R, G, B from CCD (or signal values of C, M, Y) are converted into tristimulus values by the formula (4) mentioned above are converted into chromaticity coordinate values x, y by a formula (12).

$$x=X/(X+Y+Z), y=Y/(X+Y+Z)$$

By comparing the obtained chromaticity coordinate values x, y with chromaticity coordinates $x_i$, $y_i$ of each of the standard light source shown in Table 1, the standard light source having a chromaticity point to make the value of D smallest is selected.

| Standard light source | x | y |
|---|---|---|
| A | 0.4476 | 0.4074 |
| D50 | 0.3457 | 0.3585 |
| D55 | 0.3323 | 0.3476 |
| D65 | 0.3127 | 0.3290 |
| D75 | 0.2990 | 0.3152 |
| F2 | 0.3721 | 0.3751 |
| F8 | 0.3457 | 0.3585 |
| F11 | 0.3805 | 0.3769 |

$$D = \sqrt{(x-x_i)^2 + (y-y_i)^2} \quad (13)$$

Incidentally, in the case of detecting flickers as stated above, the standard light source is selected from fluorescent light sources of F2, F8, and F11.

Since outputs from the tristimulus values converting means 16d are used for photographing light source discrimination by the photographing light source discriminating means 24 as shown in FIG. 1, even if a photographing camera is changed to another one, it is not necessary to change parameters to discriminate a photographing light source so that a structure is made in common use.

Further, besides the outputs from the tristimulus values converting means 16d, by converting appropriately outputs from the normalizing matrix 16a or the adapting matrix 16c, a kind of the photographing light source may be judged.

Incidentally, a photography may be conducted by the electronic camera under a light source other than a previously prepared standard light source. However, in order to obtain color tone under irradiation of an optional light source, it is necessary to prepare all chromaticity information of different light sources successively for the electronic camera. That may be actually impossible.

Accordingly, as matrix coefficients, chromaticity coordinates and matrix coefficients for typical standard light sources such as A, D50, D55, D65, D70, D75, F2, F8, F11 light sources are memorized, then, a standard light source having the closest chromaticity coordinates is selected from those standard light sources by the abovementioned method. Further, by gain control, the values of α, β, and γ are adjusted so as to conform with a target light source, whereby white balance is slightly adjusted and color tone under an optional light sources can be converted into color toner under the light source of day light.

A formula (14) is an example of a matrix to conduct the above processing, that is, a matrix to convert color tone of an image under F2 light source into color tone seen under D65 light source which is a light source of day light. The above mentioned matrix (4) is also an example of a matrix to conduct the above processing. Coefficients of these matrixes are obtained by the least square method in color reproducing at the time of photography a color chip under a standard light source.

Namely, the matrix in the formula (14) is a converting matrix to convert color tone at the time of photography under F2 light source into color tone at the time of photography under D65 light source. This processing is originally a non-linear conversion processing. However, since the conversion processing is conducted by a linear conversion with a matrix of three rows and three columns, each color component is not completely conformed with a theoretical value and contains an error. Then, the matrix coefficients are determined by using the least square method so as to conform the each color component after the conversion with the theoretical value as far as possible.

$$\begin{bmatrix} X \\ Y \\ Z \end{bmatrix} = \begin{bmatrix} 0.759753 & -0.024476 & 0.222979 \\ 0.296636 & 0.610623 & 0.101863 \\ -0.003773 & -0.022086 & 1.112995 \end{bmatrix} \begin{bmatrix} R_{ccd} \\ G_{ccd} \\ B_{ccd} \end{bmatrix} \quad (14)$$

Namely, in order to convert color tone under an optional light source into color tone under the light source of day light, color tone of an image photographed under a light source close to F2 light source is converted by using a matrix used for converting color tone under F2 light source into color tone under D65 light source, and further, the difference between the F2 light source and the photographing light source is subject to a fine adjustment by gain control. With this adjustment, color tone under the photographing light source can be converted into color tone under D65 light source.

As explained above, in this embodiment, by memorizing chromaticity information of a plurality of standard light sources in advance, color tone under the standard light source can be outputted for color tone of an image photographed under a different light source, whereby color reproducibility of the electronic camera can be enhanced. Further, by using together with the adapting matrix in the first embodiment, color tone in conformance with the human retinal sensitivity characteristics can be outputted.

Next, the third embodiment in which color tone is outputted in the color tone seen by eyes at the time of photography is explained.

There may be a case that an operator of the electronic camera wants to output color tone in the color tone seen by eyes at the time of photography. For example, in the color tone under a tungsten light source, red color component becomes strong so that color balance is disordered. However, when the human eye is acclimatized to such a situation, the color tone becomes to be seen as the color tone close that under the light source of day light. The color tone close that under the light source of day light is the color tone seen by eyes. Accordingly, the color toner seen by eyes is made to be outputted.

Herein, since the judgment whether the output from the electronic camera is made in the color tone seen by eyes or in the color tone under the standard light source depends on the operator's intention, the electronic camera can not automatically judge. Then, change switches are provided on the electronic camera so that the operator can switch so as to output either one of the color tones. Accordingly, if the operator appropriately operates, the target color tone can be obtained.

In order to obtain the color tone seen by eyes, in more concrete, the normalizing matrix is processed in the abovementioned manner as a unit matrix. Then, the color tone is outputted after the fine adjustment by gain control so that the color tone under the photographing light source is converted into the color tone after the operator eyes are adapted. For example, in the case of the tungsten light source, by reducing the red color component to about half, the color tone seen by eyes can be obtained.

As explained above, in this embodiment, the color tone seen by the eyes of the electronic camera operator or the color tone under the standard light source can be selected appropriately. When the color tone seen by the eyes is selected, the target color tone can be obtained while whit balance is made more suitable by simple gain control.

Incidentally, in the first through third embodiments, a series of calculation processes may be conducted by means of software or by means of hardware. As an electronic camera, a still camera, a movie camera or a scanner used to scan with a one dimensional photographing elements may be used.

Further, as the color conversion method, in addition to the abovementioned color linear matrix calculation, a combination process of LUT and an interpolation calculation disclosed in Tokukaisho 53-123201 (Japanese Patent Application Open to Public Inspection Publication No. 123201/19978) may be used.

What is claimed is:

1. An electronic camera comprising:
   photographing means for converting optical information of an image and optical information of at least three different color chips into respective plural color component data;
   first chromaticity data memory means for memorizing standard chromaticity data of the at least three different color chips, each color chip having a vector independent of others in color space;
   determining means for determining a color tone converting formula for converting current chromaticity data of the plural color component data of the three different color chips so as to conform with the memorized standard chromaticity data of the three different color chips; and
   converting means for converting the plural color component data of the image in accordance with the determined color tone converting formula.

2. The electronic camera of claim 1, wherein the memorized standard chromaticity data represent a color tone under a standard light source so that a color tone of the plural component data of the image under a light source at a time of photography is converted into the color toner under the standard light source.

3. The electronic camera of claim 1, wherein the three different color chips include a skin color color chip.

4. The electronic camera of claim 1, wherein the three different color chips include a light transmission type color chip which indicates color when light passes through.

5. The electronic camera of claim 4, wherein the light transmission type color chip is located in a light path of the photographing means only during color tone adjustment in which the photographing means is irradiated with light transmitted through the light transmission type color chip, and during usual photography, the light transmission type color chip is shifted away from the light path of the photographing means.

6. The electronic camera of claim 4, wherein the light transmission type color chip is fixed before the photographing means so that a specific section of the photographing means is irradiated with light transmitted through the light transmission type color chip.

7. The electronic camera of claim 6, wherein the specific section is positioned at an upper portion of the photographing means, and the camera further comprises a light introducing section which introduces light from an upper portion of a main body of the camera to an inside of the camera so that the specific section is irradiated with light from the light introducing section.

8. The electronic camera of claim 2, wherein the three different color chips include a light reflection type color chip which indicates color with reflected light.

9. The electronic camera of claim 1, wherein the converting formula comprises a converting matrix of three rows and three columns.

10. The electronic camera of claim 1, wherein the converting means outputs the plural color component data and the chromaticity data of the three different color chips through an interface to outside of the camera and conducts the conversion of the plural color component data of the image outside of the camera.

11. The electronic camera of claim 2, wherein the converting means converts a color tone at the time of photography under a light source of monochromatic light to an extent such that the color tone becomes close to the color tone under the standard light source.

12. The electronic camera of claim 1, further comprising:
    second chromaticity data memory means for memorizing chromaticity data of plural different standard light sources; and
    selecting means for selecting a standard light source closer to a light source at a time of photography from the plural different standard light sources based on the plural color component data;
    wherein the converting means converts the plural color component data of the image so as to convert a color tone under the selected standard light source to a color tone under a desired standard light source.

13. The electronic camera of claim 12, wherein:
    the selecting means comprises a manually selecting mode in which a kind of the light source at the time of photography is selected by an instruction of an operator and an automatically selecting mode in which the kind of the light source at the time of photography is selected based on chromaticity coordinates obtained by photographing a white object; and the operator can select the kind of the light source by selecting either one of the manually selecting mode and the automatically selecting mode.

14. The electronic camera of claim 13, wherein a switch is provided for enabling the operator to select the kind of the light source by a switching operation.

15. The electronic camera of claim 13, wherein the automatically selecting mode selects the standard light source having a chromaticity closest to the chromaticity of the light source at the time of photography from the plural standard light sources memorized in the second chromaticity data memory, and sets the selected standard light source as the light source at the time of photography.

16. The electronic camera of claim 13, wherein the automatically selecting mode detects a presence or absence of flicker of the light source at the time of photography, and when flicker is detected, the kind of the light source is selected from among fluorescent light sources.

17. The electronic camera of claim 12, wherein:

the converting means comprises direct output means for outputting the plural color component data of the image with a color tone as perceived by human eyes at the time of photography; and the plural color component data of the image may be output by one of the direct output means and with a color tone under a light source of day light.

18. The electronic camera of claim 12, further comprising fine adjusting means for finely adjusting a color tone of the plural color component data of the image to conform with a color tone under a standard light source having a chromaticity closest to the chromaticity of the light source at the time of photography by gain control; and wherein the converting means converts the color tone adjusted by the finely adjusting means into the color tone under the desired standard light source.

19. The electronic camera of claim 1, further comprising adapting means for converting a color tone of the plural color component data of the image into a color tone corresponding to an adapting characteristics of a human eye; and wherein the conversion by the adapting means and the conversion by the converting means are combined and then outputted.

20. The electronic camera of claim 19, further comprising a display which indicates a conversion process result of the plural color component data of the image and gradation converting means for converting a gradation of the image data in accordance with gradation characteristics of the display.

21. The electronic camera of claim 20, wherein at least two of the converting processes by the converting means, the adapting means and the gradation converting means are integrated in a single matrix, and the converting processes are conducted using a single matrix during general photographing.

* * * * *